May 5, 1931. H. J. GODIN 1,803,900
HEADLIGHT
Filed Jan. 18, 1930

Henry J. Godin, Inventor

Patented May 5, 1931

1,803,900

UNITED STATES PATENT OFFICE

HENRY J. GODIN, OF AUGUSTA, GEORGIA

HEADLIGHT

Application filed January 18, 1930. Serial No. 421,850.

This invention relates to new and useful improvements in headlights, and particularly to headlights for vehicles.

The particular object of the present invention is to provide a headlight by means of which rays of light may be shone on the road, in front of, and at the sides of the vehicle whereby to illuminate the road for the safety and convenience of the drivers of vehicles thereon.

Other objects and advantages will be apparent from the following description when taken in connection with the accompanying drawing.

Figure 1:
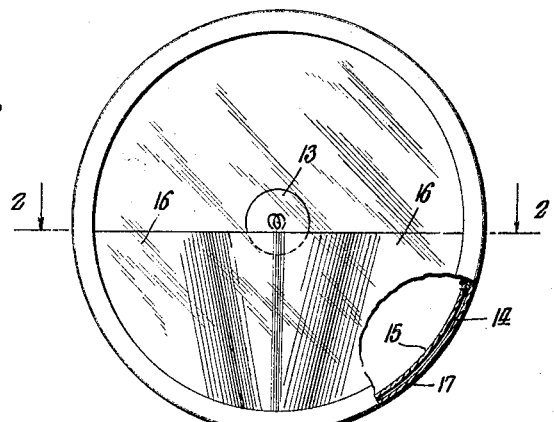
Figure 1 is a front elevation of a headlight made in accordance with the present invention.
Figure 2:
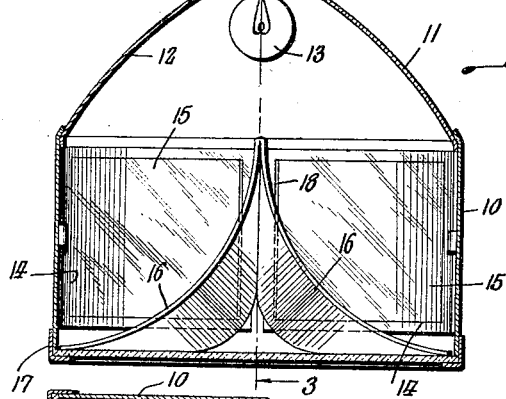
Figure 2 is a horizontal sectional view on the line 2—2 of Figure 1.
Figure 3:
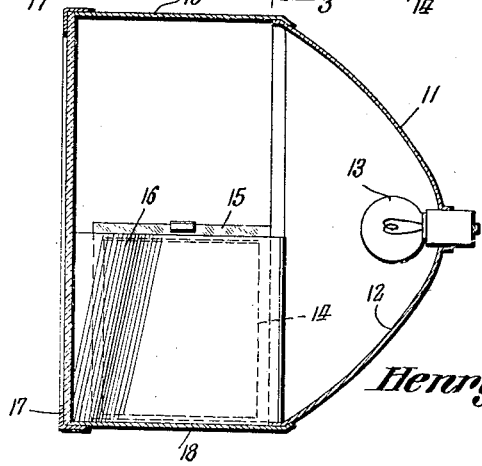
Figure 3 is a vertical sectional view on the line 3—3 of Figure 2.

Referring particularly to the accompanying drawing, 10 represents the cylindrical casing of a headlight made in accordance with the present invention, which has the rearwardly bulging rear wall 11. On the inner face of the said wall 11, is the concave reflecting surface 12, in the center of which is the usual electric lamp bulb 13.

In the lower portion of the surrounding wall of the casing are formed the openings 14, and secured in said openings are the transparent sheets of material 15. Disposed within the lower portion of the casing are two reflectors 16, each having one end disposed adjacent the lens retaining ring 17, at the front of the casing, and its rear end disposed adjacent the reflector 12, and secured to the corresponding end of the other reflector 16. Each of the reflectors 16 is slightly inclined downwardly and inwardly, from its upper edge to its lower edge, toward the center of the lower portion of the casing, so that the light rays from the lamp bulb, which shine on said reflector, will be reflected thereby, downwardly through one of the openings 14, and laterally onto the road, at the side of the automobile. The light rays, which are reflected through the other opening 14, will be directed onto the road, directly in front of the automobile, and also onto the front of the vehicle. Other light rays are reflected forwardly, from the reflector 12, out through the front of the lamp casing, onto the road ahead of the vehicle, as will be readily understood. Separating the openings 14 is a strip 18, to which are secured the lower edges of the reflectors 16.

What is claimed is:

A headlight including a casing having a front light opening and light openings in the lower side thereof, a reflector for directing light rays through said front opening, and reflectors disposed in the lower field of reflection of the first reflector extending forwardly from said first reflector in curving divergent relation toward said front opening, said divergent reflectors being inclined upwardly and away from each other into partially covering relation to said lower openings, whereby to direct light rays through said lower openings.

In testimony whereof, I affix my signature.

HENRY J. GODIN.